(12) United States Patent
Power, II et al.

(10) Patent No.: US 11,179,584 B2
(45) Date of Patent: Nov. 23, 2021

(54) CONTOURED SADDLE ASSEMBLY (71) Applicant: Tethrd LLC, Carver, MN (US)

(72) Inventors: Walter Ernest Power, II, Jordan, MN (US); Gregory Alan Godfrey, Richmond Hill, GA (US); Carl Eugene Kossuth, III, Jordan, MN (US)

( * ) Notice: Subject to any disclaimer, the term of this patent is extended or adjusted under 35 U.S.C. 154(b) by 0 days.

(21) Appl. No.: 17/167,776

(22) Filed: Feb. 4, 2021

(65) Prior Publication Data
US 2021/0178201 A1  Jun. 17, 2021

Related U.S. Application Data (63) Continuation of application No. 16/717,676, filed on Dec. 17, 2019, now abandoned.

(51) Int. Cl.
*A62B 35/00* (2006.01)
*A01M 31/02* (2006.01)
*A63B 27/00* (2006.01)

(52) U.S. Cl.
CPC ......... *A62B 35/0012* (2013.01); *A01M 31/02* (2013.01); *A63B 27/00* (2013.01)

(58) Field of Classification Search
CPC ..... A62B 35/0012; A62B 27/00; A10M 31/02
See application file for complete search history.

(56) References Cited

U.S. PATENT DOCUMENTS

| 296,769 | A | * | 4/1884 | Miller et al. | A62B 1/06 |
|---|---|---|---|---|---|
| | | | | | 182/191 |
| 2,680,593 | A | * | 6/1954 | McIntyre | A62B 1/10 |
| | | | | | 182/231 |
| 2,829,702 | A | * | 4/1958 | Keating | B60N 2/4242 |
| | | | | | 297/183.9 |
| 3,484,833 | A | * | 12/1969 | Stephen | B63C 5/02 |
| | | | | | 297/467 |
| 3,587,952 | A | * | 6/1971 | Higuchi | A47D 13/025 |
| | | | | | 224/160 |
| 3,992,055 | A | * | 11/1976 | Shaw | A01M 31/02 |
| | | | | | 182/187 |
| 4,101,165 | A | | 7/1978 | Hammer | |
| 4,347,914 | A | * | 9/1982 | Gary | A45F 3/26 |
| | | | | | 182/142 |
| 4,508,045 | A | * | 4/1985 | Spanier | B63H 8/54 |
| | | | | | 114/39.18 |
| 4,687,074 | A | * | 8/1987 | Green | A45F 3/26 |
| | | | | | 182/3 |

(Continued)

FOREIGN PATENT DOCUMENTS

| GB | 966637 A | * | 8/1964 | ......... A62B 35/0018 |
| WO | WO2018111624 | | 6/2018 | |

*Primary Examiner* — Colleen M Chavchavadze (57) ABSTRACT

A contoured saddle assembly includes a saddle with a closed loop formed by an upper strap, a lower strap, a first lateral strap and a second lateral strap. Each of the upper and lower straps has a forward edge lying in a forward plane and rearward edge lying in a rearward plane. A panel comprising a flexible material is attached to and extends from the first lateral strap to the second lateral strap. A receiving section of the panel traverses a space between the upper and lower straps. The receiving section has a concavely shaped interior surface facing the forward plane. A belt strap is attached to the saddle adjacent to the upper strap and a pair of leg straps each has an attached end attached to the saddle.

16 Claims, 5 Drawing Sheets

(56) References Cited

U.S. PATENT DOCUMENTS

| | | | | |
|---|---|---|---|---|
| 5,010,850 A * | 4/1991 | Sailer | ............... | A01K 27/00 |
| | | | | 182/3 |
| 5,069,153 A * | 12/1991 | Pascher | ............... | B63H 8/54 |
| | | | | 114/39.18 |
| 5,070,962 A * | 12/1991 | Varner | ............... | A62B 35/0037 |
| | | | | 182/7 |
| 5,921,345 A * | 7/1999 | Cheng | ............... | A62B 35/0012 |
| | | | | 182/7 |
| 5,944,381 A * | 8/1999 | Nguyen | ............... | A47C 3/0255 |
| | | | | 297/281 |
| 6,035,966 A * | 3/2000 | Lewis | ............... | A01M 31/02 |
| | | | | 182/150 |
| 6,223,854 B1 * | 5/2001 | Nolz | ............... | A41D 13/0007 |
| | | | | 182/133 |
| 7,051,836 B2 * | 5/2006 | Green | ............... | A01M 31/02 |
| | | | | 182/187 |
| 7,063,185 B2 * | 6/2006 | Green | ............... | A01M 31/02 |
| | | | | 182/187 |
| 8,061,479 B2 | 11/2011 | Harris, Jr. | | |
| 8,292,028 B2 | 10/2012 | Wise | | |
| 8,322,488 B2 * | 12/2012 | Green | ............... | A01M 31/02 |
| | | | | 182/3 |
| 8,356,691 B2 | 1/2013 | Griffith | | |
| 8,584,799 B1 | 11/2013 | Dennington | | |
| 9,162,091 B2 * | 10/2015 | Kuhnert | ............... | A62B 35/0012 |
| 9,320,925 B2 | 4/2016 | Wise | | |
| 9,808,659 B2 | 11/2017 | Chevalier | | |
| 10,016,633 B2 * | 7/2018 | Perner | ............... | A62B 35/0012 |
| 10,035,029 B2 * | 7/2018 | Dawson | ............... | A62B 35/04 |
| 10,201,257 B2 * | 2/2019 | Sandberg | ............... | A47K 13/005 |
| 10,258,814 B2 | 4/2019 | Casebolt | | |
| 10,933,260 B2 * | 3/2021 | Nance | ............... | A62B 35/0025 |
| 2003/0176122 A1 | 9/2003 | Schwindt | | |
| 2008/0179136 A1 | 7/2008 | Griffith | | |
| 2009/0255756 A1 | 10/2009 | Green | | |
| 2012/0217090 A1 * | 8/2012 | Green | ............... | A62B 35/0018 |
| | | | | 182/8 |
| 2019/0269948 A1 * | 9/2019 | Green Mullins | .. | A62B 35/0018 |
| 2020/0324153 A1 * | 10/2020 | Power, II | ............... | A01M 31/02 |
| 2020/0398087 A1 * | 12/2020 | Power, II | ............... | A62B 35/0012 |
| 2020/0398088 A1 * | 12/2020 | Power, II | ............... | A62B 35/0012 |

* cited by examiner

CONTOURED SADDLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hunting saddle device and more particularly pertains to a new hunting saddle device for conforming to a person to improve the comfort of the user of the saddle and to inhibit the saddle from shifting or sliding off of the user.

(2) Description of Related Art Including Information Disclosed Under 37 CFR 1.97 and 1.98

The prior art relates to hunting saddle devices that are conventionally used as part of safety harnesses. These safety harnesses are secured to trees to prevent a person from falling from the tree while hunting, for example. The saddle device is used to engage the person's buttocks such that the saddle generally receives the buttocks and typically extends above and below the buttocks. Conventional saddles may comprise upper and lower strapping which may or may not include cloth or mesh paneling extending between the upper and lower strapping. These saddles, when laid on a flat surface, will have a flattened profile as they are not shaped to encourage effective contouring to the buttocks. The lack of a contour in a traditional saddle results in an increase in pressure against a user of the device along upper and lower straps of a saddle while the saddle is supporting the user's weight.

BRIEF SUMMARY OF THE INVENTION

An embodiment of the disclosure meets the needs presented above by generally comprising a saddle configured to receive the buttocks of a person. The saddle includes closed loop formed by a continuous strap. The continuous strap has an upper strap, a lower strap, a first lateral strap and a second lateral strap. The closed loop includes a front side, a back side, a first lateral edge and a second lateral edge. The first and second lateral edges are arcuate such that the closed loop has an elongated oval shape. The first and second lateral edges are configured to engage a bridge line such that the bridge line can be secured to a tree. Each of the upper and lower straps has a forward edge lying in a forward plane and a rearward edge lying in a rearward plane. The forward plane is spaced forward of the rearward plane. A panel comprising a flexible material is attached to the upper and lower straps and extends from the first lateral strap to the second lateral strap, wherein the panel is spaced from the first and second lateral edges. A receiving section of the panel is defined which traverses a space between the upper and lower straps. The receiving section continuously extends along corresponding ones of the rearward edges such that the receiving section is entirely positioned rearward of the forward plane and extends rearwardly away from the rear plane. The receiving section has a concavely shaped interior surface facing the forward plane. A belt strap is attached to the saddle adjacent to the upper strap.

In another embodiment, the disclosure teaches a saddle configured to receive the buttocks of a person. The saddle includes a closed loop that is formed by a continuous strap. The continuous strap includes an upper strap, a lower strap, a first lateral strap and a second lateral strap. The closed loop has a front side, a back side, a first lateral edge and a second lateral edge. The first and second lateral edges are arcuate such that the closed loop has an elongated oval shape. The first and second lateral edges are configured to engage a bridge line such that the bridge line can be secured to a tree. Each of the upper and lower straps has a forward edge lying in a forward plane and a rearward edge lying in a rearward plane. The forward plane is spaced forward of the rearward plane. A panel of flexible material is attached to the upper and lower straps and extends from the first lateral strap to the second lateral strap. A receiving section of the panel is defined which traverses a space between the upper and lower straps. The receiving section continuously extends along corresponding ones of the rearward edges such that the receiving section is entirely positioned rearward of the forward plane and extends rearwardly away from the rear plane. The upper and lower straps are each angled inwardly from the forward edge to the rearward edge toward an area bounded by the closed loop such that any line extending from the rearward edge of the upper or lower straps perpendicularly through the forward plane forms an acute angle with the front side.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
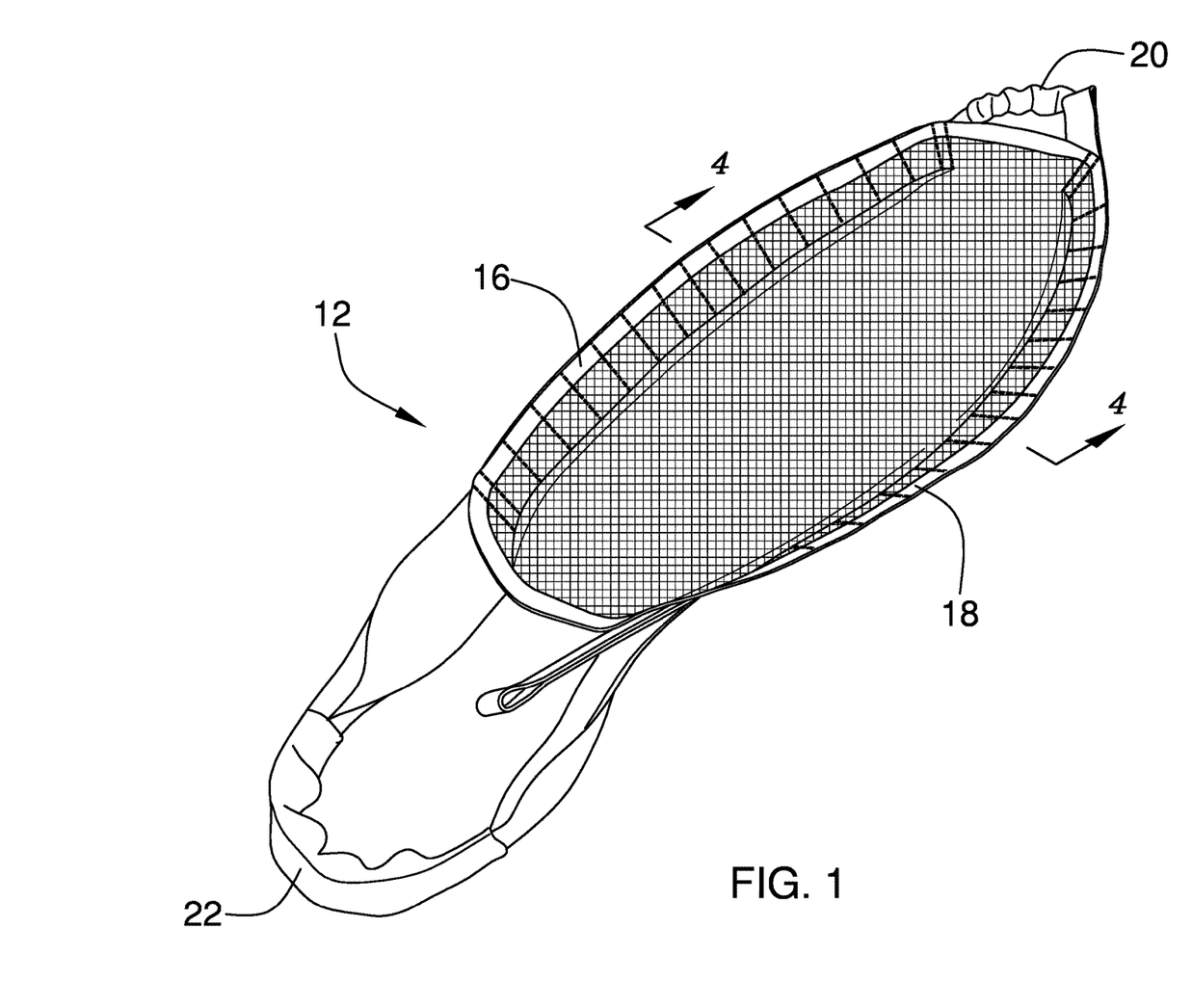
FIG. 1 is a top isometric view of a contoured saddle assembly according to an embodiment of the disclosure.
Figure 2:
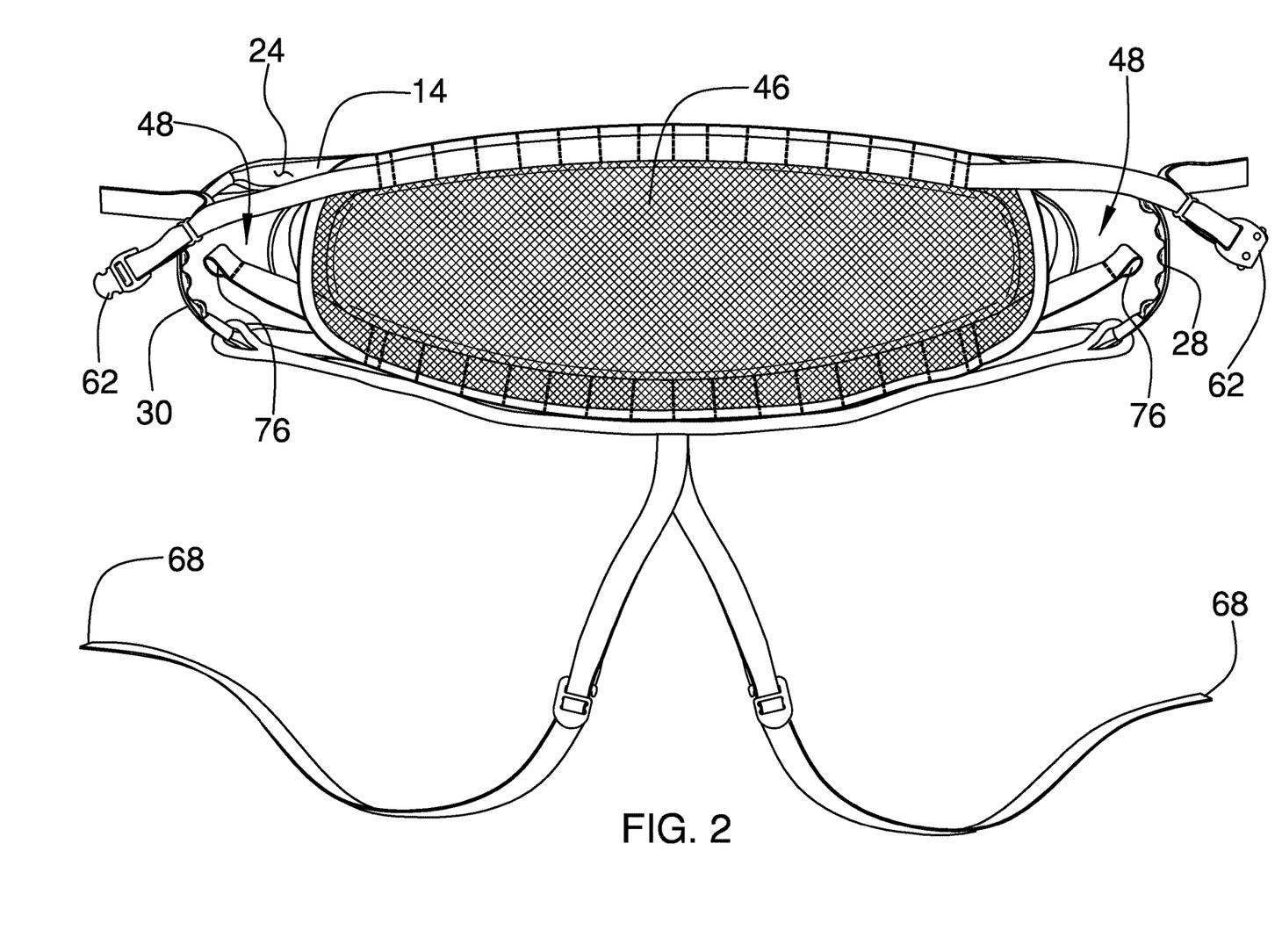
FIG. 2 is a front view of an embodiment of the disclosure.
Figure 3:
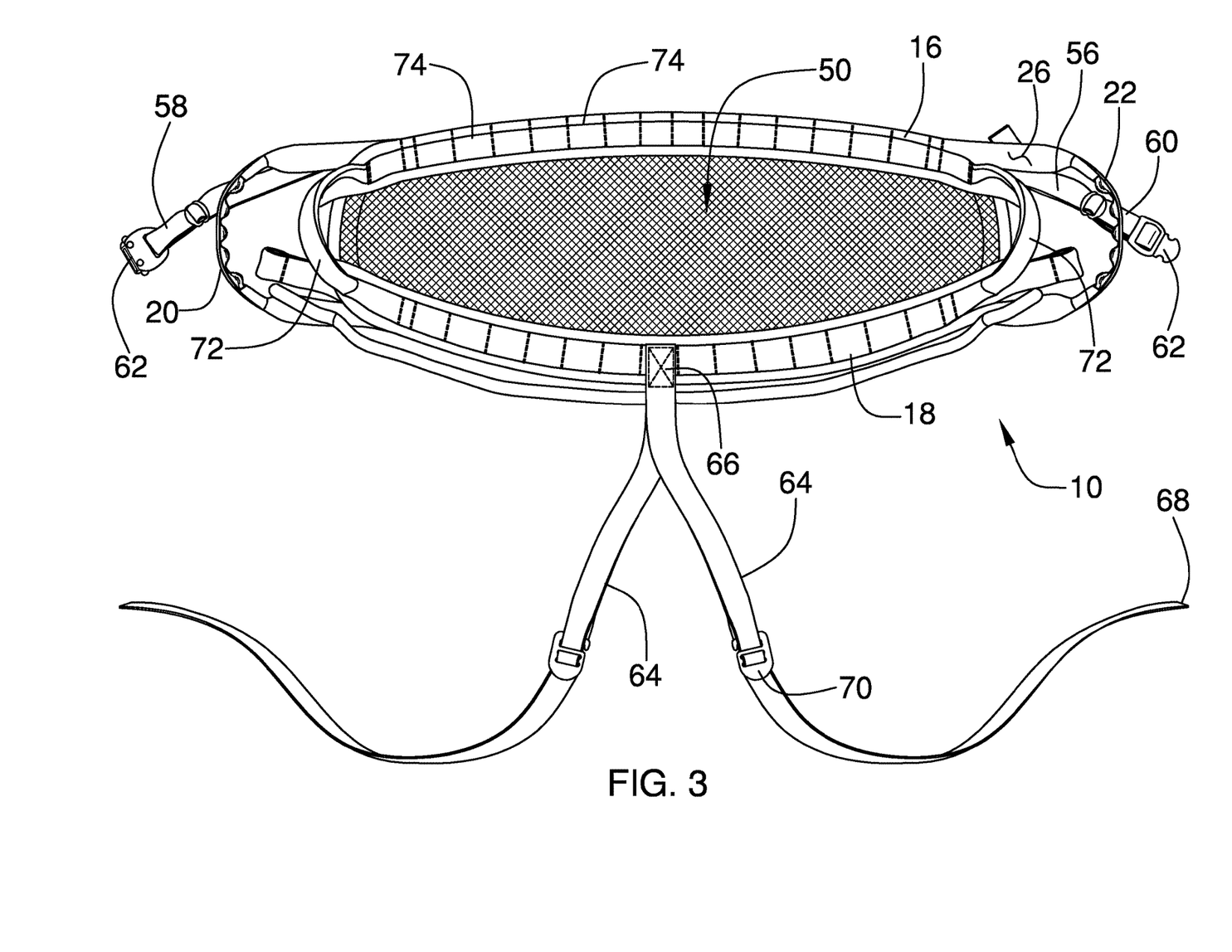
FIG. 3 is a rear view of an embodiment of the disclosure.
Figure 4:
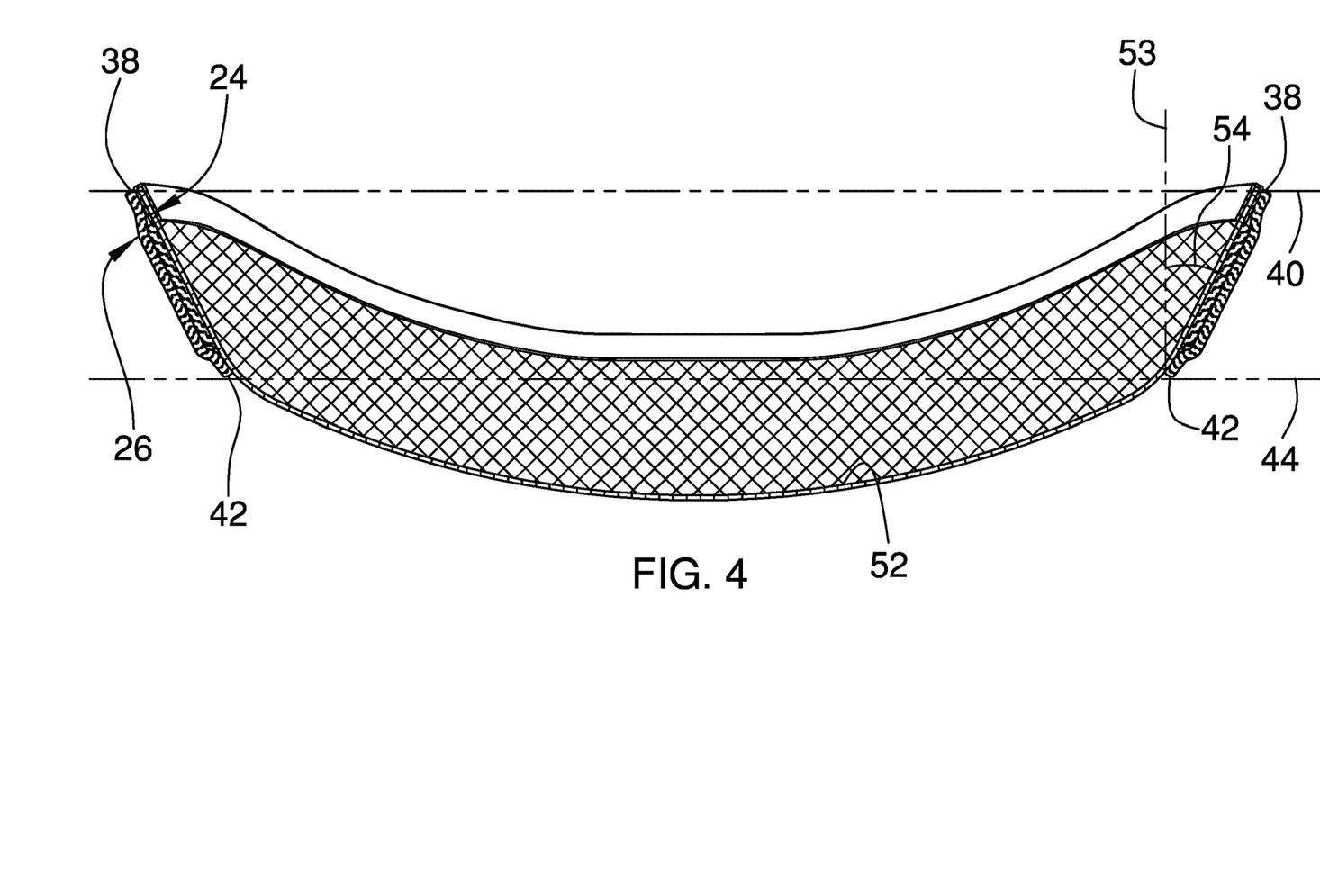
FIG. 4 is a cross-sectional view of an embodiment of the disclosure taken along line 4-4 of FIG. 1.
Figure 5:
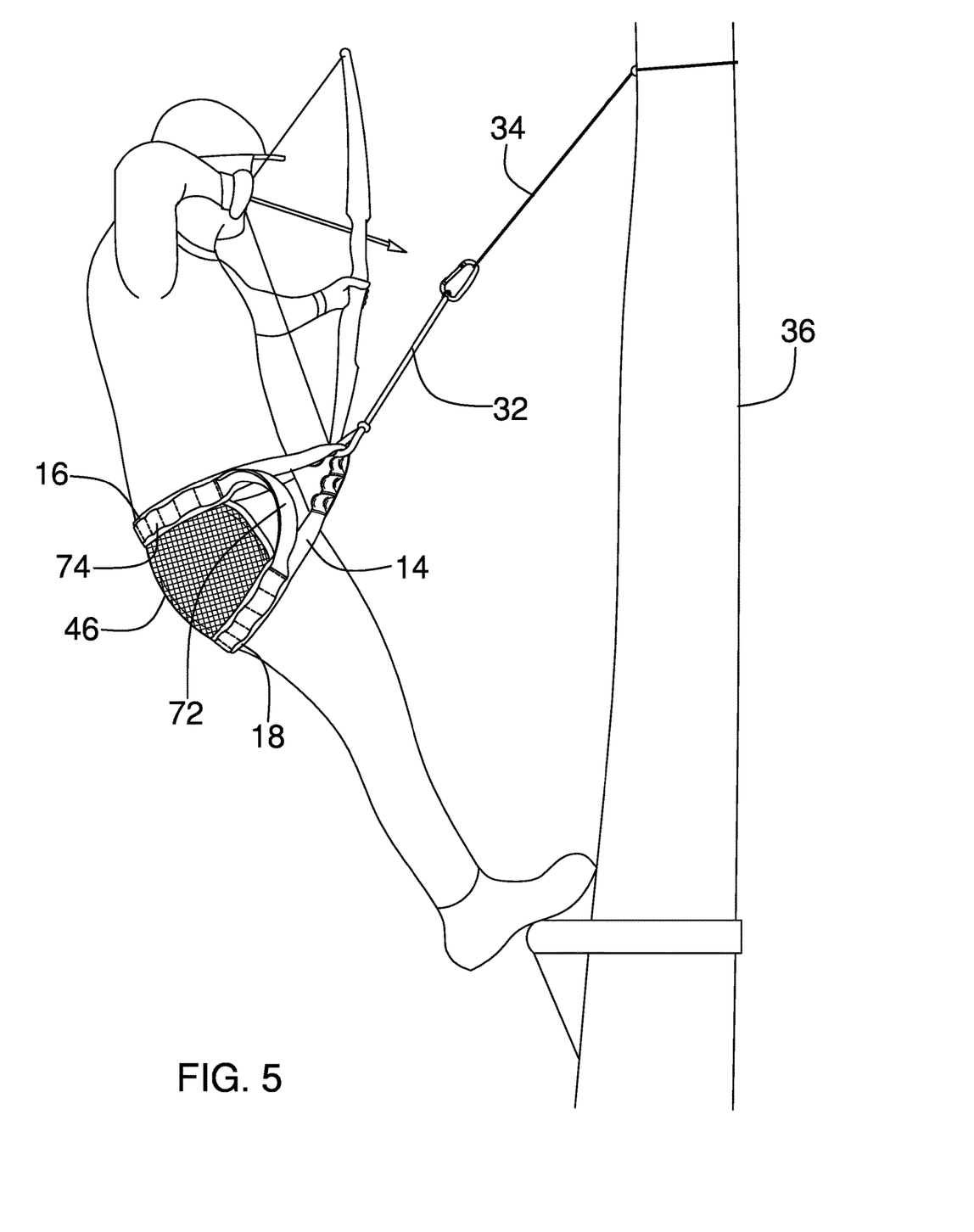
FIG. 5 is a side in-use view of an embodiment of the disclosure.

With reference now to the drawings, and in particular to FIGS. 1 through 5 thereof, a new hunting saddle device embodying the principles and concepts of an embodiment of the disclosure and generally designated by the reference numeral 10 will be described.

As best illustrated in FIGS. 1 through 5, the contoured saddle assembly 10 generally comprises a saddle 12 configured to receive the buttocks of a person. The saddle 12 includes a closed loop 14 that may be formed by a continuous strap. The continuous strap, or closed loop 14, includes an upper strap 16, a lower strap 18, a first lateral strap 20 and a second lateral strap 22. It should be understood that the terms upper, lower, first lateral and second lateral straps does not necessitate multiple straps as the closed loop 14 may be comprised of a single unitary strap, a pair of straps, or multiple ones of the straps and that the terms used herein are for explanation purposes only. However, the continuous strap may be used such that the closed loop 14 functions as a unitary structure.

The closed loop 14 includes a front side 24, a back side 26, a first lateral edge 28 and a second lateral edge 30. The first 28 and second 30 lateral edges are arcuate such that the closed loop 14 has an elongated oval shape. The first 28 and second 30 lateral edges are configured to engage a bridge line 32 such that the bridge line 32 can be secured to a tree 36 by way of a tree line 34, also known as a tree tether rope. As shown best in FIG. 4, each of the upper 16 and lower 18 straps has a forward edge 38 lying in a forward plane 40 and each of the upper 16 and lower 18 straps has a rearward edge 42 lying in a rearward plane 44. The term "lying in" is used to denote that the forward 38 and rearward 42 edges may be positioned in their corresponding planes simultaneously as the closed loop 14 is comprised of a flexible material. The forward plane 40 is spaced forward of the rearward plane 44.

A panel 46 comprised of a flexible material is attached to the upper 16 and lower 18 straps. The panel extends from the first lateral strap 20 to the second lateral strap 22. That is, the first lateral strap 20 and the second lateral strap 22 are defined herein as the areas of the closed loop 14 from termination of the panel 46 to the corresponding one of the first 28 and second lateral edges. Thus, the panel 46 is spaced from the first 28 and second 30 lateral edges to form openings 48 to receive the bridge line 32. A receiving section 50 of the panel 46 is defined which traverses a space between the upper 16 and lower 18 straps. The receiving section 50 continuously extends along corresponding ones of the rearward edges 42 such that the receiving section 50 is entirely positioned rearward of the forward plane 40 and extends rearwardly away from the rear plane 44. The receiving section 50 has an interior surface 52 facing the forward plane 40. The interior surface 52 of the receiving section 50 is concavely shaped. The panel 46 may be comprised of a mesh material for the purpose of allowing heat transfer through the panel 46. Alternatively, the panel 46 may be comprised of a synthetic or natural cloth material. The panel 46 will typically be comprised of a resiliently stretchable material, though non-stretchable materials may also be utilized.

The upper 16 and lower 18 straps are each angled inwardly from the forward edge 38 to the rearward edge 42 toward an area bounded by the closed loop 14, or continuous strap, such that any line 53 extending from the rearward edge 42 of the upper 16 or lower straps 18 perpendicularly through the forward plane 40 forms an acute angle 54 with the front side 24. The acute angle 54 is continuously acute along the panel 46 where the panel joins the upper 16 and lower 18 straps. That is, while the acute angle 54 may not be a constant angle, it is continuously acute along the upper 16 and lower 18 straps. This acute angle facilitates the creation of the concave interior surface 52. The acute angle is greater than 15° and less than 75° and may more preferably be between 25° and 65°.

The concave interior surface 52 and the angle of the upper 16 and lower 18 straps may be achieved in numerous ways. For example, attachment of the panel 46 to the closed loop 14 such that the rearward edges 42 are crimped more than the forward edges 38 would cause the rearward edges 42 to have a shorter effective length than the forward edges 38. In another example, this may be achieved by altering the shape of the upper 16 and lower 18 straps such that the rearward edges 42 have a shorter length than the forward edges 38.

The assembly 10 will typically include additional features such as a belt strap 56 attached to the saddle 12 adjacent to the upper strap 16. The belt strap 56 includes a first free portion 58 extending adjacent to the first lateral edge 28 and a second free portion 60 adjacent to the second lateral edge 30. A coupler 62, which may include a buckle having male and female components, releasably couples together the first 58 and second 60 free portions to form a waist belt configured to extend around a waist of the person. A pair of leg straps 64 each has an attached end 66 that is attached to the saddle 12 and a free end 68 extending downwardly away from the saddle 12. Each of the leg straps 64 is configured to be extended around a different one of a pair of legs of the person. The leg straps 64 each include a securing member 70 to releasably secure the leg straps 64 to attachment loops 76 positioned on lateral sides of the closed loop 14 to form closed loops that extend around a user's legs. A pair of lineman's loops 72, which functions as connection points for a lineman's rope, is attached to the back side of the saddle 12. The first 28 and second 30 lateral edges each have one of the lineman's loops 72 positioned adjacent thereto. The lineman's loops 72 each comprise a webbing material having a first end attached to the upper strap 16 and a second end attached to the lower strap 18. As is shown in the Figures, MOLLE (modular lightweight load-carrying equipment) connectors/receivers 74 may be positioned on the assembly 10.

In use, the saddle 12 is placed on the buttocks in a conventional manner and secured in place with the waist belt 56. However, the saddle 12 has a unique shape which allows it to "cup" the buttocks and thereby contour more readily to the shape of the buttocks. The concave nature of the panel 46 and the angle of the upper 16 and lower 18 straps increase comfort for the wearer of the assembly 10 not only when they are being supported by the assembly 10 in a tree, but while walking to or from hunting locations.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A harness assembly comprising:
  a saddle configured to receive the buttocks of a person, the saddle including:
    a closed loop including an upper strap, a lower strap, a first lateral strap and a second lateral strap, the closed loop including a front side, a back side, a first lateral edge and a second lateral edge, the first and second lateral edges being arcuate such that the closed loop has an elongated oval shape, the first and second lateral edges being configured to engage a bridge line such that the bridge line can be secured to a tree, each of the upper and lower straps having a forward edge lying in a forward plane, each of the upper and lower straps having a rearward edge lying in a rearward plane, the forward plane being spaced forward of the rearward plane, a length of the forward edges of the upper and lower straps being longer than a length of the rearward edges of the upper and lower straps wherein the upper and lower straps remain angled relative to each other within the closed loop;
    a panel comprising a flexible material being attached to the upper and lower straps and extending from the first lateral strap to the second lateral strap such that the panel is spaced from the first and second lateral edges, a receiving section of the panel is defined which traverses a space between the upper and lower straps, the receiving section continuously extending along corresponding ones of the rearward edges such that the receiving section is entirely positioned rearward of the forward plane and extends rearwardly away from the rear plane, the receiving section having an interior surface facing the forward plane, the interior surface being concavely shaped; and
  a belt strap being attached to the saddle adjacent to the upper strap.

2. The harness assembly according to claim 1, wherein the panel is comprised of a mesh material.

3. The harness assembly according to claim 1, wherein the panel is comprised of a cloth material.

4. The harness assembly according to claim 1, wherein the panel is comprised of a resiliently elastic material.

5. The harness assembly according to claim 1, wherein the panel is comprised of a non-elastic material.

6. The harness assembly according to claim 1, wherein the upper and lower straps are each angled inwardly front the forward edge to the rearward edge toward an area bounded by the closed loop such that any line extending from the rearward edge of the upper or lower straps perpendicularly through the forward plane forms an acute angle with the front side.

7. The harness assembly according to claim 6, wherein the acute angle is continuously acute along joined areas of the upper and lower straps with the panel.

8. The harness assembly according to claim 6, wherein the acute angle is greater than 15° and less than 75°.

9. A harness assembly comprising:
  a saddle configured to receive the buttocks of a person, the saddle including:
    a closed loop being formed by a continuous strap, the continuous strap including an upper strap, a lower strap, a first lateral strap and a second lateral strap, the closed loop including a front side, a back side, a first lateral edge and a second lateral edge, the first and second lateral edges being arcuate such that the closed loop has an elongated oval shape, the first and second lateral edges being configured to engage a bridge line such that the bridge line can be secured to a tree, each of the upper and lower straps having a forward edge lying in a forward plane, each of the upper and lower straps having a rearward edge lying in a rearward plane, the forward plane being spaced forward of the rearward plane, a length of the forward edges of the upper and lower straps being longer than a length of the rearward edges of the upper and lower straps wherein the upper and lower straps remain angled relative to each other within the closed loop;
    a panel comprising a flexible material being attached to the upper and lower straps and extending from the first lateral strap to the second lateral strap such that said panel is spaced from the first and second lateral edges, a receiving section of the panel is defined which traverses a space between the upper and lower straps, the receiving section continuously extending along corresponding ones of the rearward edges such that the receiving section is entirely positioned rearward of the forward plane and extends rearwardly away from the rear plane;
    the upper and lower straps each being angled inwardly from the forward edge to the rearward edge toward an area bounded by the closed loop such that any line extending from the rearward edge of the upper or lower straps perpendicularly through the forward plane forms an acute angle with the front side.

10. The harness assembly according to claim 9, wherein the acute angle is continuously acute along joined areas of the upper and lower straps with the panel.

11. The harness assembly according to claim 10, wherein the acute angle is greater than 15° and less than 75°.

12. A harness assembly comprising:
  a saddle configured to receive the buttocks of a person, the saddle including:
    a closed loop being formed by a continuous strap, the continuous strap including an upper strap, a lower strap, a first lateral strap and a second lateral strap, the closed loop including a front side, a back side, a first lateral edge and a second lateral edge, the first and second lateral edges being arcuate such that the closed loop has an elongated oval shape, the first and second lateral edges being configured to engage a bridge line such that the bridge line can be secured to a tree, each of the upper and lower straps having a forward edge lying in a forward plane, each of the upper and lower straps having a rearward edge lying in a rearward plane, the forward plane being spaced forward of the rearward plane, a length of the forward edges of the upper and lower straps being longer than a length of the rearward edges of the upper and lower straps wherein the upper and lower straps remain angled relative to each other within the closed loop;

a panel comprising a flexible material being attached to the upper and lower straps and extending from the first lateral strap to the second lateral strap such that said panel is spaced from said first and second lateral edges, a receiving section of the panel is defined which traverses a space between the upper and lower straps, the receiving section continuously extending along corresponding ones of the rearward edges such that the receiving section is entirely positioned rearward of the forward plane and extends rearwardly away from the rear plane, the receiving section having an interior surface facing the forward plane, the interior surface being concavely shaped;

the upper and lower straps each being angled inwardly from the forward edge to the rearward edge toward an area bounded by the closed loop such that any line extending from the rearward edge of the upper or lower straps perpendicularly through the forward plane forms an acute angle with the front side, the acute angle being continuously acute along joined areas of the upper and lower straps with the panel, the acute angle being greater than 15° and less than 75°;

a belt strap being attached to the saddle adjacent to the upper strap, the belt strap including a first free portion positioned adjacent to the first lateral edge and a second free portion positioned adjacent to the second lateral edge, a coupler releasably coupling together the first and second free portions to form a waist belt configured to extend around a waist of the person;

a pair of leg straps each having an attached end being attached to the saddle and a free end extending downwardly away from the saddle, each of the leg straps being configured to be extended around a different one of a pair of legs of the person, each of the leg straps including a securing member to releasably secure the leg straps in a closed loop; and a pair of lineman's loops being attached to the back side of the saddle, each of the first and second lateral edges having one of the lineman's loops positioned adjacent thereto.

13. The harness assembly according to claim 12, wherein the panel is comprised of a mesh material.

14. The harness assembly according to claim 12, wherein the panel is comprised of a cloth material.

15. The harness assembly according to claim 12, wherein the panel is comprised of a resiliently elastic material.

16. The harness assembly according to claim 12, wherein the panel is comprised of a non-elastic material.

\* \* \* \* \*

EX PARTE REEXAMINATION CERTIFICATE (12359th)
United States Patent
Power, II et al.

(10) Number: US 11,179,584 C1
(45) Certificate Issued: Aug. 15, 2023

(54) CONTOURED SADDLE ASSEMBLY

(71) Applicant: Tethrd LLC, Carver, MN (US)

(72) Inventors: Walter Ernest Power, II, Jordan, MN (US); Gregory Alan Godfrey, Richmond Hill, GA (US); Carl Eugene Kossuth, III, Jordan, MN (US)

Reexamination Request:
No. 90/015,081, Sep. 4, 2022

Reexamination Certificate for:
Patent No.: 11,179,584
Issued: Nov. 23, 2021
Appl. No.: 17/167,776
Filed: Feb. 4, 2021

Related U.S. Application Data

(63) Continuation of application No. 16/717,676, filed on Dec. 17, 2019, now abandoned.

(51) Int. Cl.
*A62B 35/00* (2006.01)
*A01M 31/02* (2006.01)
*A63B 27/00* (2006.01)

(52) U.S. Cl.
CPC ......... *A62B 35/0012* (2013.01); *A01M 31/02* (2013.01); *A63B 27/00* (2013.01)

(58) Field of Classification Search
CPC ............... A01M 31/02; A62B 35/0012; A62B 35/0037; A62B 35/0025; A45F 3/26
See application file for complete search history.

(56) References Cited

To view the complete listing of prior art documents cited during the proceeding for Reexamination Control Number 90/015,081, please refer to the USPTO's Patent Electronic System.

*Primary Examiner* — Sara S Clarke (57) ABSTRACT

A contoured saddle assembly includes a saddle with a closed loop formed by an upper strap, a lower strap, a first lateral strap and a second lateral strap. Each of the upper and lower straps has a forward edge lying in a forward plane and rearward edge lying in a rearward plane. A panel comprising a flexible material is attached to and extends from the first lateral strap to the second lateral strap. A receiving section of the panel traverses a space between the upper and lower straps. The receiving section has a concavely shaped interior surface facing the forward plane. A belt strap is attached to the saddle adjacent to the upper strap and a pair of leg straps each has an attached end attached to the saddle.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 6 is cancelled.

Claims 1, 7, 8, 9 and 12 are determined to be patentable as amended.

Claims 2-5, 10, 11, 13, 14, 15 and 16, dependent on an amended claim, are determined to be patentable.

1. A harness assembly comprising:
    a saddle configured to receive the buttocks of a person, the saddle including:
        a closed loop including an upper strap, a lower strap, a first lateral strap and a second lateral strap, the closed loop including a front side, a back side, a first lateral edge and a second lateral edge, the first and second lateral edges being arcuate such that the closed loop has an elongated oval shape, the first and second lateral edges being configured to engage a bridge line such that the bridge line can be secured to a tree, each of the upper and lower straps having a forward edge lying in a forward plane, each of the upper and lower straps having a rearward edge lying in a rearward plane, the forward plane being spaced forward of the rearward plane, a length of the forward edges of the upper and lower straps being longer than a length of the rearward edges of the upper and lower straps wherein the upper and lower straps remain angled relative to each other within the closed loop;
        a panel comprising a flexible material being attached to the upper and lower straps and extending from the first lateral strap to the second lateral strap such that the panel is spaced from the first and second lateral edges, *the panel being a single continuous panel of the flexible material*, a receiving section of the panel is defined which traverses a space between the upper and lower straps, the receiving section continuously extending along corresponding ones of the rearward edges such that the receiving section is entirely positioned rearward of the forward plane and extends rearwardly away from the rear plane, the receiving section having an interior surface facing the forward plane, the interior surface being concavely shaped; *wherein the upper and lower straps are each angled inwardly from the forward edge to the rearward edge toward an area bounded by the closed loop such that any line extending from the rearward edge of the upper or lower straps perpendicularly through the forward plane forms an acute angle with the front side such that the upper and lower straps create a concave interior surface of the panel*; and
        a belt strap being attached to the saddle adjacent to the upper strap.

7. The harness assembly according to claim [6] *1*, wherein the acute angle is continuously acute along joined areas of the upper and lower straps with the panel.

8. The harness assembly according to claim [6] *1*, wherein the acute angle is greater than 15° and less than 75°.

9. A harness assembly comprising:
    a saddle configured to receive the buttocks of a person, the saddle including:
        a closed loop being formed by a continuous strap, the continuous strap including an upper strap, a lower strap, a first lateral strap and a second lateral strap, the closed loop including a front side, a back side, a first lateral edge and a second lateral edge, the first and second lateral edges being arcuate such that the closed loop has an elongated oval shape, the first and second lateral edges being configured to engage a bridge line such that the bridge line can be secured to a tree, each of the upper and lower straps having a forward edge lying in a forward plane, each of the upper and lower straps having a rearward edge lying in a rearward plane, the forward plane being spaced forward of the rearward plane, a length of the forward edges of the upper and lower straps being longer than a length of the rearward edges of the upper and lower straps wherein the upper and lower straps remain angled relative to each other within the closed loop;
        a panel comprising a flexible material being attached to the upper and lower straps and extending from the first lateral strap to the second lateral strap such that said panel is spaced from the first and second lateral edges, *the panel being a single continuous panel of the flexible material*, a receiving section of the panel is defined which traverses a space between the upper and lower straps, the receiving section continuously extending along corresponding ones of the rearward edges such that the receiving section is entirely positioned rearward of the forward plane and extends rearwardly away from the rear plane;
        the upper and lower straps each being angled inwardly from the forward edge to the rearward edge toward an area bounded by the closed loop such that any line extending from the rearward edge of the upper or lower straps perpendicularly through the forward plane forms an acute angle with the front side *such that the upper and lower straps create a concave interior surface of the panel*.

12. A harness assembly comprising:
    a saddle configured to receive the buttocks of a person, the saddle including:
        a closed loop being formed by a continuous strap, the continuous strap including an upper strap, a lower strap, a first lateral strap and a second lateral strap, the closed loop including a front side, a back side, a first lateral edge and a second lateral edge, the first and second lateral edges being arcuate such that the closed loop has an elongated oval shape, the first and second lateral edges being configured to engage a bridge line such that the bridge line can be secured to a tree, each of the upper and lower straps having a forward edge lying in a forward plane, each of the upper and lower straps having a rearward edge lying in a rearward plane, the forward plane being spaced forward of the rearward plane, a length of the forward edges of the upper and lower straps being longer than a length of the rearward edges of the upper and lower straps wherein the upper and lower straps remain angled relative to each other within the closed loop;

a panel comprising a flexible material being attached to the upper and lower straps and extending from the first lateral strap to the second lateral strap such that said panel is spaced from said first and second lateral edges, *the panel being a single continuous panel of the flexible material*, a receiving section of the panel is defined which traverses a space between the upper and lower straps, the receiving section continuously extending along corresponding ones of the rearward edges such that the receiving section is entirely positioned rearward of the forward plane and extends rearwardly away from the rear plane, the receiving section having an interior surface facing the forward plane, the interior surface being concavely shaped;

the upper and lower straps each being angled inwardly from the forward edge to the rearward edge toward an area bounded by the dosed loop such that any line extending from the rearward edge of the upper or lower straps perpendicularly through the forward plane forms an acute angle with the front side *such that the upper and lower straps create a concave interior surface of the panel*, the acute angle being continuously acute along joined areas of the upper and lower straps with the panel, the acute angle being greater than 15° and less than 75°;

a belt strap being attached to the saddle adjacent to the upper strap, the belt strap including a first free portion positioned adjacent to the first lateral edge and a second free portion positioned adjacent to the second lateral edge, a coupler releasably coupling together the first and second free portions to form a waist belt configured to extend around a waist of the person;

a pair of leg straps each having an attached end being attached to the saddle and a free end extending downwardly away from the saddle, each of the leg straps being configured to be extended around a different one of a pair of legs of the person, each of the leg straps including a securing member to releasably secure the leg straps in a closed loop; and a pair of lineman's loops being attached to the back side of the saddle, each of the first and second lateral edges having one of the lineman's loops positioned adjacent thereto.

\* \* \* \* \*